United States Patent Office 3,409,696
Patented Nov. 5, 1968

3,409,696
DEHYDROGENATION CATALYSTS COMPRISING BISMUTH COMPOUNDS ON MACROPOROUS SUPPORTS
Harvey Minnis, Brian H. Oliver, and John Henry Rolston, Sarnia, Ontario, Canada, assignors to Polymer Corporation Limited, Sarnia, Ontario, Canada, a corporation
No Drawing. Filed May 13, 1965, Ser. No. 455,597
Claims priority, application Canada, July 16, 1964, 907,350
12 Claims. (Cl. 260—680)

ABSTRACT OF THE DISCLOSURE

Dehydrogenation of hydrocarbons is effected in the presence of steam and a catalyst which comprises at least one bismuth compound supported on an inorganic phosphate of a Group II metal, the support having a macroporous structure.

---

The present invention relates to new and effective catalysts for use in certain hydrocarbon dehydrogenation reactions and to the use of such catalysts in such reactions.

The catalysts of the present invention derive their activity from the presence therein of a bismuth compound. It was previously known that bismuth compounds could be used for stabilizing catalyst materials which, in themselves, had dehydrogenating activity, for example, small proportions of bismuth oxide have been incorporated as stabilizers in dehydrogenation catalysts comprising iron oxide, chromium oxide and a potassium compound. It is also known to use compounds containing both bismuth and their metals such as molybdenum and tungsten, for example, bismuth tungstate, bismuth molybdate, bismuth phosphotungstate and bismuth phosphomolybdate, either as such or on inert supports, as hydrocarbon oxidation catalysts but these catalysts were reported to require the presence of molecular oxygen to be effective. The presence of molecular oxygen was also reported to be required to obtain useful hydrocarbon oxidation activity in the known use of bismuth phosphate. This known use of unsupported bismuth compounds also has the disadvantage that pellets of such unsupported bismuth compounds shrink during use and rapidly lose their activity. It has also been reported that other bismuth compounds, particularly bismuth oxide, have, in themselves or on inert supports, no dehydrogenating activity.

The present invention is based on our surprising discovery that it is possible to prepare useful hydrocarbon dehydrogenation catalysts which are effective for prolonged operation irrespective of whether or not molecular oxygen is present, using any bismuth compound. These catalysts are obtained using one or more bismuth compounds in conjunction with certain supports. The supports which can be used in the catalysts of the present invention are broadly defined as those in which at least 60% of the total pore volume of said support is contributed by pores having diameters in the range of from 1000 to 8000 Angstrom units (A.).

Accordingly, the present invention provides a hydrocarbon dehydrogenation catalyst comprising at least one bismuth compound on a support in which at least 60% of the total pore volume of said support is contributed by pores having diameters in the range of from 1000 to 8000 A.

Any supports may be used in the catalysts of the present invention provided that they comply with the aforesaid pore size distribution requirement. The supports used in the catalysts of the invention preferably have at least 80% of their total pore volume contributed by pores with diameters in the range of from 1000 to 8000 A., and more preferably with at least 90% of their total pore volume contributed by pores with diameters in the range of from 1000 to 6000 A.

It has been fund that particularly useful catalysts can be provided with supports which are inorganic phosphates, particularly phosphates of a Group II metal. Examples of suitable supports are calcium phosphate and magnesium phosphate. Active catalysts have also been prepared using sintered alumina supports which comply with the above pore size distribution requirements.

The extent to which the bismuth compound or compounds may be used on the support will depend on the nature of the bismuth compound and the supports and on the particular hydrocarbon dehydrogenation process in which it is intended to use the resulting catalyst. The amount of bismuth compound used also depends to some extent on the procedure adopted for incorporating it into the catalyst. Useful catalysts have been obtained with amounts as small as 2% and as large as 75% by weight based on the total catalyst composition. In general the bismuth compounds are incorporated to the extent of from 1 to 80% by weight based on the total catalyst composition.

The method by which the bismuth compound or compounds are incorporated in the support will also depend upon the natures of the bismuth compound or compounds and the support. In many cases, it has proved satisfactory to form the catalysts by simple dry mixing of the bismuth compound or compounds with the supports. Alternatively, when the catalyst components are prepared in a wet form, the mixing may be effected prior to drying the components. In the case of catalysts prepared by simple admixture of the bismuth compound with the support, it is preferred to use the bismuth compound or compounds to the extent of from about 5 to about 60% and more preferably to the extent of from about 20 to about 60% by weight based on the total catalyst composition. In the case of incorporation by simple admixture, particularly satisfactory results have been obtained by the use of bismuth oxide or a compound capable of forming a bismuth oxide under the hydrocarbon dehydrogenation process conditions. Such bismuth oxide formation may also occur during the regeneration operation described below. Examples of the preferred bismuth compounds for use in the catalysts of the present invention are bismuth oxide, bismuth hydroxide, bismuth phosphate, and bismuth phosphomolybdate.

A further method for incorporating the bismuth compounds involves impregnating a preformed support with an acidic solution of the bismuth compound or compunds. This procedure cannot be used for supports which would be adversely affected by the acidic solution but has proved satisfactory with acid-resistant supports such as sintered alumina.

If desired, the catalysts of the invention may be modified for particular applications by the incorporation of other active or inactive materials. Some improvement in activity has, for instance, been noted on the incorporation of small proportions, for example, 0.5 to 5% by weight of chromic oxide in catalysts with calcium phosphate supports.

The catalysts of the present invention can be used in any conventional dehydrogenation reactions but are particularly useful in the dehydrogenation, both in the absence and the presence of molecular oxygen, of at least one hydrocarbon selected from aliphatic monoolefins having at least four and preferably four to six carbon atoms in their unsaturated carbon chains, alkylated aromatic hydrocarbons having at lesat two and preferably two to four carbon atoms in their alkyl groups, cycloaliphatic olefins having five to eight carbon atoms in their olefinically unsaturated rings and cycloalkanes having five to seven carbon atoms. In accordance with standard practice, references herein to the "unsaturated carbon chain" of a monoolefin denote the longest carbon chain which contains the olefinic double bond.

The catalysts of the present invention are especially useful for the dehydrogenation of butene-1 and/or butene-2 to butadiene, of isoamylene to isoprene, and of ethyl benzene to styrene. They can also be applied to the dehydrogenation of a mixed olefin feed stock such as a mixture of n-butene and isoamylene.

The catalysts of the present invention are also useful for the dehydrogenation, in the presence of molecular oxygen of paraffinic hydrocarbons containing at least three and preferably three to eight carbon atoms, particularly for the dehydrogenation of butane to butenes and butadiene.

Hydrocarbon dehydrogenation reactions using the novel catalysts of the invention are preferably carried out at elevated temperature in the presence of steam. It should be noted that these reactions must not be effected at a temperature at which the pore size distribution of the support would deviate substantially from the limitations set down above. It should also be noted that the supports may only conform to the pore size distribution requirements after they have been heated to an elevated temperature. For instance, in the case of calcium phosphate, it is necessary for it to be heated, for example, at a temperature of about 650° C. for about 16 hours or more, to obtain the desired pore size distribution. Since the pore size limitations apply to the support itself, the temperature to which any such catalyst mixture should be heated will first be determined on a separate sample before the incorporation of the bismuth compound or compounds even though the actual heating will be effected on the whole catalyst composition. It must be stressed that the pore size limitations apply to the support after any heat treatment and not to the whole catalyst composition which will generally have a completely different pore size distribution.

Dehydrogenation reactions using the novel catalysts of the invention are generally carried out at temperatures between 500° C. and 750° C. or at temperatures not greatly outside this range. Such dehydrogenation is preferably effected at temperatures between 500 and 650° C.

As previously stated, the dehydrogenation reaction is preferably carried out in the presence of steam and the amount of steam is generally between 5 and 40, preferably between 10 and 25, volumes per volume of hydrocarbon although smaller or larger proportions may be used if desired.

Except for the foregoing limitations, the hydrocarbon dehydrogenation conditions may be varied widely. For instance, the method is operable at widely varying flow rates, although the rates of flow should, of course, be sufficient to avoid excessive decomposition of the dehydrogenated product.

For fixed bed operation, the catalysts of the present invention are preferably used in the form of pills, tablets or pellets of a suitable size and such pellets may be formed from a powdered material by admixture with a lubricant such as graphite, a vegetable oil or a hydrocarbon oil which may subsequently be removed by vaporization or oxidation. To prepare these new catalysts for use in hydrocarbon dehydrogenation processes, the reaction chamber is charged with the granular catalysts and the lubricant, if used, is "burnt off" by passing air or preferably a mixture of up to about 50% air with steam, through the catalyst bed at an elevated temperature. When the lubricant used for preparing the catalyst pellets is a substance capable of being vaporized, e.g., a mineral oil or vegetable oil, the burn-off treatment with air and steam may be preceded by one of passing an inert gas such as steam, nitrogen or carbon dioxide over the catalyst at a temperature of from 200–600° C. so as to vaporize at least a portion of the binding agent from the catalyst granules. Obviously, steam will not be passed through the catalyst bed until the temperature of the latter exceeds the temperature at which the steam would condense thereon. As previously indicated, the desired pore size distribution of some supports may only be obtained after the catalyst composition has been heated. The necessary modification of the pore size distribution may, therefore, be effected during the lubricant-removal operation and/or in a separate heat treatment operation following the lubricant-removal operation.

After freeing the catalyst of the lubricant, the catalyst bed is generally swept free of air with steam and is heated to the desired reaction temperature, preferably by passing superheated steam through the bed. The mixture of steam and the hydrocarbon feed, optionally with oxygen, is then passed through the catalyst bed at the desired temperature. The usual procedure is to pass the hydrocarbon feed into admixture with steam which has been superheated to a temperature sufficient for the reactant mixture to be at the desired reaction temperature, and to pass the resulting mixture through the catalyst bed. However, the heat may be supplied in other ways. The vapours issuing from the catalyst chambers are ordinarily passed through heat exchangers and through cooling devices, first to condense the steam and then to separate the product.

During use in hydrocarbon dehydrogenation reactions, the catalysts of the present invention may gradually accumulate a small amount of carbon or nonvolatile organic material and consequently lose their catalytic activity. To regenerate such catalysts, the flow of hydrocarbon starting material is periodically interrupted and air admixed with steam is blown through the catalyst bed at a suitable elevated temperature, for example, at a temperature 500 and 750° C., to oxidize and remove the carbonaceous or organic material. The duration of the catalyst regeneration period is related to the duration of the preceding dehydrogenation period. In general, the catalysts will be used in a cyclic operation comprising alternate dehydrogenation and regeneration operations.

For some supports, there may be a temperature above which the support cannot be heated without loss of the required pore size distribution. In such a case, the catalyst will not be heated above such a temperature in any of the operating stages, i.e., the lubricant-removal operation, any separate heat treatment operation, the actual dehydrogenation operation and the regeneration treatment. In addition, it is undesirable to heat the catalysts to such a temperature that the bismuth compound or compounds melt or are converted to bismuth metal. In the case of bismuth oxide-containing catalysts, temperatures greater than about 820° C. will not normally be used.

The invention will now be illustrated in the following examples in which, unless otherwise stated, all parts and percentages are by weight.

EXAMPLE 1

6.7 litres of an aqueous solution containing 462 g./litre of calcium chloride were filtered and 2333 g. of 85% orthophosphoric acid were then added, thereby giving approximately 8.7% excess phosphoric acid over the amount which would be required to form calcium phosphate. The solution was then made up to 12.0 litres with distilled water. This stock solution was then fed at the rate of 5.5 ml. per minute into a 600 ml. beaker where it was diluted with water and, from which it was fed, after dilution, into a glass reaction vessel at the rate of approximately 130 ml. per minute, the reaction vessel having a capacity of 15 litres, being maintained at a temeprature of 25° C., and being fitted with a propeller type mixer and baffles for producing turbulence.

An aqueous ammonium hydroxide solution containing 14% v./v. $NH_3$ was fed into the reaction vessel so that the pH of the agitated mixture was maintained at 8.0.

The resulting slurry was agitated and allowed to overflow from the reaction vessel and to run to waste until steady state conditions were established. The overflowing slurry was then collected in a settling tank for a period of 16 hours and then allowed to settle in contact with the precipitation mother liquor for a further period of 24 hours, after which the mother liquor was decanted from the settling tank and the settled slurry was filtered and washed with distilled water. The washed filter cake was then mulled for one half hour without any heating and then for a few minutes with distilled water. The resulting slurry was then refiltered and washed with distilled water. The washing treatment comprising the mulling, filtering and washing operations was then repeated three times. The filter residue was then returned to the muller where it was partially dried for a period of 1½ hours with a 15 p.s.i.g. steam pressure. The partially dried material was then transferred to trays and dried overnight in an oven at 65° C. The oven temperature was then increased to 300° C. and the drying operation was terminated three hours after the commencement of the oven temperature rise from 65° C.

After removal from the oven, a portion of the material was ground by hand to pass through a Tyler Standard 10 mesh sieve and then thoroughly mixed by hand with 2% graphite. The mixture was then formed into cylindrical pellets of $3/16''$ diameter and $3/16''$ length and having shallow-convex ends.

The removal of the graphite was effected at different temperatures and for varying times by passing a mixture of steam and air over approximately 23 g. of the pellets at the following flow rates:

|  | Ml./minute |
|---|---|
| Steam (calculated at room temperature and pressure) | 2000 |
| Air (measured at room temperature and pressure) | 100 |

After this treatment, the pore size distributions of the pellets were determined by the mercury penetration method and the results given in Table 1 were obtained. The mercury penetration method is described in an article by H. L. Ritter and L. C. Drake, Ind. and Eng. Chem., Anal. Ed., 17, No. 12, 782–786, 1945. The pore size distribution determinations were made at a maximum mercury pressure of 3000 p.s.i.

From these results, it will be seen that the calcium phosphate of Test No. 1 does not conform to the pore size distribution requirements for supports according to the invention, in not having at least 60% of its total pore volume contributed by pores with diameters in the range of from 1000 to 8000 A.

Several catalysts were prepared by mixing 50 parts of the calcium phosphate, after removal from the drying oven, with varying proportions of bismuth oxide. The resulting mixtures were then mixed with 2% graphite, and in one case with 2% chromic oxide, pelleted and the graphite-removal operation performed under the conditions set down in Table 1.

After the removal of the graphite, the catalytic activities of the pellets for the dehydrogenation of butene-1 were determined at the temperatures specified in Table 2. The activity determinations were effected using mixtures of steam and butene-1 in the approximate relative proportion of 20 volumes of steam per volume of hydrocarbon. The dehydrogenation product was analyzed by gas chromatography, no account being taken of the formation of carbonyls or coke.

The "percent conversion" (%C) as expressed by 100 times the number of moles pentene-1 converted divided by the total number of moles of butene-1 in the feed, the "percent selectivity" (%S) as expressed by 100 times the number of moles of butene-1 converted to butadiene, divided by the total number of moles of butene-1 reacted, and the "percent yield" (%Y) as expressed by the product of the "percent conversion" and the "percent selectivity" were calculated. Several tests were made and the results obtained are given in Table 2.

A further series of activity determinations was made in the same manner except that 25% by volume of free oxygen based on the butene-1 was added to the feed. The mean results of several determinations are given in Table 3.

Dehydrogenation activities were also determined for pellets prepared from unsupported bismuth oxide and for calcium phosphate containing no bismuth oxide. In the case of the unsupported bismuth oxide, the activity determination was effected on unpelleted material, whilst, in the case of the bismuth-free calcium phosphate, the pellets were formed using 2% graphite, no chromic oxide being included, and the graphite-removal operation was effected for 16 hours at 650° C.

TABLE 1.—PORE SIZE DISTRIBUTIONS OF CALCIUM PHOSPHATE PELLETS AFTER DIFFERENT GRAPHITE-REMOVAL OPERATIONS

| Test No. | Graphite-removal conditions | | Pore size distribution—percentage of total pore volume from pores of specified diameters | | | | | | | | | | | |
|---|---|---|---|---|---|---|---|---|---|---|---|---|---|---|
|  | Hrs. | °C. | <1,000 A. | 1,000–2,000 A. | 2,000–3,000 A. | 3,000–4,000 A. | 4,000–5,000 A. | 5,000–6,000 A. | 6,000–7,000 A. | 7,000–8,000 A. | 8,000–9,000 A. | 9,000–10,000 A. | >10,000 A. | 1,000–8,000 A. | 1,000–6,000 A. |
| 1 | 16 | 602 | 80.3 | 19.7 | 0 | 0 | 0 | 0 | 0 | 0 | 0 | 0 | 0 | 19.7 | 19.7 |
| 2 | 16 | 650 | 2.1 | 94.5 | 2.2 | 2.2 | 0.3 | 0.3 | 0.2 | 0.2 | 0.7 | 0.7 | 0.7 | 97.2 | 97.0 |
| 3 | 16 | 811 | 0 | 3.8 | 17.7 | 28.5 | 29.9 | 11.8 | 1.4 | 1.0 | 1.0 | 1.0 | 4.9 | 94.1 | 91.7 |
| 4 | 64 | 790 | 0 | 0 | 6.6 | 35.0 | 29.2 | 12.4 | 5.8 | 2.2 | 1.5 | 1.5 | 5.8 | 91.2 | 83.2 |

TABLE 2.—NON-OXIDATIVE DEHYDROGENATION OF BUTENE-1 WITH CALCIUM PHOSPHATE, BISMUTH OXIDE AND CALCIUM PHOSPHATE/BISMUTH OXIDE CATALYSTS

| Test No. | Catalyst Composition | | | Graphite removal conditions | | Pore size (diameter) distribution* (percent) | | Temperature of dehydrogenation activity determinations | | | | | | | | |
|---|---|---|---|---|---|---|---|---|---|---|---|---|---|---|---|---|
|  |  |  |  |  |  |  |  | 600° C. | | | 620° C. | | | 650° C. | | |
|  | Ca₃(PO₄)₂ | Bi₂O₃ | Cr₂O₃ | hrs. | °C. | 1,000–8,000 A. | 1,000–6,000 A. | %C | %S | %Y | %C | %S | %Y | %C | %S | %Y |
| 2 | 100 | 0 | 0 | 16 | 650 | 97.2 | 97.0 | 3.6 | 91.0 | 3.3 |  |  |  | 6.5 | 89.0 | 5.8 |
| 5 | 0 | 100 | 0 |  |  |  |  | Inactive at all temperatures tested, even after heating at 650° C. | | | | | | | | |
| 6 | 50 | 50 | 0 | 16 | 602 | 19.7 | 19.7 | 55.9 | 61.6 | 34.4 | 56.0 | 66.8 | 37.4 |  |  |  |
| 7 | 50 | 50 | 0 | 16 | 650 | 97.2 | 97.0 | 34.2 | 68.8 | 23.5 |  |  |  | 56.1 | 68.7 | 38.5 |
| 8 | 50 | 50 | 0 | 16½ | 811 | 94.1 | 91.7 | 29.5 | 73.6 | 21.7 | 38.9 | 68.9 | 26.8 |  |  |  |
| 9 | 50 | 50 | 0 | 64 | 790 | 91.2 | 83.2 | 22.5 | 81.3 | 18.3 | 36.0 | 80.0 | 28.8 |  |  |  |
| 10 | 50 | 50 | 2 | 16 | 650 | 97.2 | 97.0 | 37.9 | 70.9 | 26.9 |  |  |  | 61.5 | 73.9 | 45.4 |
| 11 | 25 | 75 | 0 | 16 | 650 | 97.2 | 97.0 | 38.2 | 67.8 | 25.9 | 52.5 | 66.8 | 35.1 |  |  |  |

*The pore size distribution results are quoted from Table 1 and apply to the bismuth-free calcium phosphate after the graphite-removal operation.

TABLE 3.—OXIDATIVE DEHYDROGENATION (25% V./V./O₂) OF BUTENE-1 WITH CALCIUM PHOSPHATE/BISMUTH OXIDE CATALYSTS

| Test No. | Catalyst Composition | | | Graphite-removal conditions | | Pore size (diameter) distribution *(percent) | | Dehydrogenation activity determination temperature | | | | | |
|---|---|---|---|---|---|---|---|---|---|---|---|---|---|
| | | | | | | | | 600° C. | | | 650° C. | | |
| | Ca₃(PO₄)₂ | Bi₂O₃ | Cr₂O₃ | hrs. | ° C. | 1,000–8,000 A. | 1,000–6,000 A. | %C | %S | %Y | %C | %S | %Y |
| 12 | 50 | 50 | 0 | 16 | 650 | 97.2 | 97.0 | 39.5 | 63.9 | 25.2 | 59.1 | 69.4 | 41.0 |
| 13 | 50 | 50 | 2 | 16 | 650 | 97.2 | 97.0 | 41.5 | 64.3 | 26.7 | 56.9 | 78.7 | 44.8 |

*The pore size distribution results are quoted from Table 1 and apply to the bismuth-free calcium phosphate after the graphite-removal operation.

From these results, it will be seen that calcium phosphate having a pore size distribution conforming to the broad requirements of the invention (Test No. 2) in itself shows substantially no dehydrogenation activity. Test No. 5 showed that unsupported bismuth oxide also has substantially no catalytic activity. Although the support itself and bismuth oxide are both substantially inactive, it will be seen from the results of Tests Nos. 7 and 10 to 13 that, when the bismuth oxide is supported on the calcium phosphate, the resultant catalyst exhibits substantial dehydrogenation activity in both the absence and presence of molecular oxygen.

The results of Tests Nos. 10 and 13 show that a small proportion of chromic oxide may optionally be included in the catalysts of the present invention having calcium phosphate supports.

It will be seen that, although the support of Test No. 6 was outside the definition of those which can be used in the catalysts of the invention, the catalyst prepared from such a support apparently exhibited substantial dehydrogenation activity. This catalyst was, however, unstable, metallic bismuth being formed on the surface of the catalyst pellets during use. Such a catalyst is consequently considered to be unsuitable for use in accordance with the present invention in dehydrogenation reactions.

It should also be noted that the support used in Test No. 9 met the broad and preferred requirements for the present invention but that it did not comply with the more preferred requirement of having at least 90% of its total pore volume contributed by pores with diameters in the range of from 1000 to 6000 A. It will be noted that the catalyst prepared from such support showed somewhat reduced activity compared to that used in Tests Nos. 7 and 8 which did in fact comply with the more preferred pore size distribution requirements.

EXAMPLE 2

A further catalyst was prepared as described for Test No. 2 in Example 1, except that 25 parts of bismuth phosphate were mixed with 75 parts of the calcium phosphate, together with the 2 parts of graphite and 2 parts of chromic oxide. The activity of this catalyst for the dehydrogenation of butene-1 was determined (after removal of the graphite by heating for 16 hours at 650° C.) as generally described in Example 1 in the presence of 10% v./v. oxygen in a 17-day continuous cyclic process, each cycle comprising alternating 5 minute dehydrogenation and 5 minute regeneration steps, the regeneration being effected with a mixture of 420 v./v./hr. of air and 2300 v./v./hr. of steam. The results given in Table 4 indicate the activities at various stages during the test.

TABLE 4.—OXIDATIVE DEHYDROGENATION (10% V./V. O₂) OF BUTENE-1 USING A BISMUTH PHOSPHATE/CALCIUM PHOSPHATE CATALYST

| Test No. | Catalyst Composition | | | Days of Operation | Temperature (° C.) | Dehydrogenation Activity | | |
|---|---|---|---|---|---|---|---|---|
| | Ca₃(PO₄)₂ | BiPO₄ | Cr₂O₃ | | | %C | %S | %Y |
| 14 | 75 | 25 | 2 | 14 | 555 | 48.8 | 82.2 | 40.1 |
| 15 | 75 | 25 | 2 | 15 | 565 | 54.3 | 81.9 | 44.5 |
| 16 | 75 | 25 | 2 | 17 | 600 | 59.6 | 78.8 | 47.0 |

These results indicate that the catalyst had a substantially high dehydrogenation activity, even after 17 days continuous operation.

A similar catalyst was prepared from 50 parts bismuth phosphate and 50 parts calcium phosphate, followed by the addition of 2 parts of graphite and 2 parts of chromic oxide. The graphite was removed by heating for 16 hours at 650° C. and this catalyst was evaluated in the dehydrogenation of ethyl benzene to styrene. The following results were obtained at a dehydrogenation temperature of 625° C.

Test No. 17

Percent
Conversion of ethyl benzene _____ 29.4
Selectivity (styrene obtained expressed as percentage of ethyl benzene converted) _____ 65.9
Yield (styrene obtained expressed as percentage of ethyl benzene fed to reactor) _____ 19.4

These results indicate that catalysts according to the present invention are active in the dehydrogenation of alkylated aromatic hydrocarbons such as ethyl benzene.

EXAMPLE 3

A further catalyst was prepared as described for Test No. 2 in Example 1 except that 50 parts of bismuth phosphomolybdate (Bi:P:Mo=12:1:12) were mixed with 50 parts of the calcium phosphate together with the 2 parts of graphite. The activity of this catalyst for the dehydrogenation of butene-1 in the absence of added oxygen, after removal of the graphite by heating for 16 hours at 650° C., was determined exactly as described in Example 1. The following results were obtained at a dehydrogenation temperature of 600° C.

Test No. 18

Percent
Conversion _____ 48.0
Selectivity _____ 96.1
Yield _____ 46.1

It will be seen that the bismuth phosphomolybdate/calcium phosphate catalyst had substantial dehydrogenation activity even though the calcium phosphate itself is substantially inactive (Test No. 2).

EXAMPLE 4

A further catalyst was prepared as described for Test No. 2 in Example 1 except that 50 parts of bismuth hydroxide were mixed with 50 parts of the calcium phosphate together with the 2 parts of graphite. After removal of the graphite by heating for 16 hours at 650° C., this catalyst was evaluated in the dehydrogenation of butene-1 in the manner described in Example 1 in both the absence and the presence of 25% by volume of oxygen (based on the butene-1). The results obtained are given in Tables 5 and 6.

TABLE 5.—NON-OXIDATIVE DEHYDROGENATION OF BUTENE-1 USING A BISMUTH HYDROXIDE/CALCIUM PHOSPHATE CATALYST

| Test No. | Catalyst Composition | | Dehydrogenation Temperature | | | | | |
|---|---|---|---|---|---|---|---|---|
| | | | 600° C. | | | 650° C. | | |
| | Ca₃(PO₄)₂ | Bi(OH)₃ | %C | %S | %Y | %C | %S | %Y |
| 19 | 50 | 50 | 42.5 | 73.4 | 31.2 | 49.1 | 74.9 | 36.8 |

TABLE 6.—OXIDATIVE DEHYDROGENATION (25% V./V. O$_2$) OF BUTENE-1 USING A BISMUTH HYDROXIDE/CALCIUM PHOSPHATE CATALYST

| Test No. | Catalyst Composition | | Dehydrogenation Temperature | | | | | |
|---|---|---|---|---|---|---|---|---|
| | | | 600° C. | | | 650° C. | | |
| | Ca$_3$(PO$_4$)$_2$ | Bi(OH)$_3$ | %C | %S | %Y | %C | %S | %Y |
| 20 | 50 | 50 | 48.4 | 68.1 | 33.0 | 50.9 | 71.0 | 36.1 |

These results indicate the catalytic activity of yet another catalyst according to the present invention. The substantially complete inactivity of calcium phosphate has already been noted (Test No. 2).

EXAMPLE 5

Magnesium phosphate was prepared in exactly the same manner as described in Example 1 for the preparation of calcium phosphate except that, instead of a total weight of 3095 g. of calcium chloride (6.7 litres of a 462 g./litre solution), 5670 g. of magnesium chloride (12 litres of a 473 g. magnesium chloride hexahydrate per litre solution) were used.

The resulting magnesium phosphate was ground by hand to pass through a Tyler Standard 10 mesh sieve and then thoroughly mixed by hand with 2% graphite. The mixture was then formed into cylindrical pellets of ³⁄₁₆″ diameter and ³⁄₁₆″ length and having shallow convex ends.

The graphite was next removed from a 23 g. sample of these pellets generally in the manner described in Example 1 by passing a mixture of steam and air over them for 16 hours at 650° C.

After this treatment, the pore size distribution of the pellets was determined by the mercury penetration method and the results given in Table 7 were obtained.

Test No. 23.—Oxidative dehydrogenation (25% v./v. O$_2$) of butene-1

Catalyst: Mg$_3$(PO$_4$)$_2$/Bi$_2$O$_3$/Cr$_2$O$_3$—(50/50/2).
Dehydrogenation temperature: 620° C.
Conversion: 41.4%.
Selectivity: 75.6%.
Yield: 31.3%.

From these results, it will be seen that this magnesium phosphate-supported catalyst possessed substantial dehydrogenation activity.

EXAMPLE 6

Catalysts were prepared by impregnation of the following support materials:

(a) A sintered alumina in the form of ¼″ diameter pellets and ¼″ length cylindrical;

(b) Extruded cylindrical silicon carbide pellets (³⁄₁₆″ diameter and length); and (c) Extruded cylindrical silica pellets (³⁄₁₆″ diameter and length).

The impregnation of these materials was effected by soaking a weighed quantity of pellets for 10 minutes in a saturated aqueous solution of bismuth nitrate in 35% nitric acid. After removal from the solution, the wet pellets were dried and then heated for a period of 5 hours at a temperature of 600–700° C. in air. The impregnation procedure was then repeated once, after which the amount of bismuth retained by the pellets as bismuth oxide was calculated from the weight increase and expressed as a percentage of the total weight.

The pore size distributions of separate samples of each

TABLE 7.—PORE SIZE DISTRIBUTION OF MAGNESIUM PHOSPHATE PELLETS AFTER GRAPHITE-REMOVAL AT 650° C. FOR 16 HOURS

| Test No. | Pore size distribution—percentage of total pore volume from pores of specified diameters | | | | | | | | | | | |
|---|---|---|---|---|---|---|---|---|---|---|---|---|
| | <1,000 A. | 1,000–2,000 A. | 2,000–3,000 A. | 3,000–4,000 A. | 4,000–5,000 A. | 5,000–6,000 A. | 6,000–7,000 A. | 7,000–8,000 A. | 8,000–9,000 A. | 9,000–10,000 A. | >10,000 A. | 1,000–8,000 A. | 1,000–6,000 A. |
| 21 | 9.2 | 43.9 | 38.8 | 3.1 | 1.0 | 0 | 0 | 0 | 4.0 | 4.0 | 4.0 | 86.8 | 86.8 |

A catalyst was next prepared by mixing 50 parts of the ground magnesium phosphate with 50 parts of bismuth oxide. The resulting mixture was then mixed with 2 parts graphite and 2 parts chromic oxide, pelleted and the graphite removed as previously described for 16 hours at 650° C. The activity of the resulting catalyst for the dehydrogenation of butene-1 was then determined generally as described in Example 1, both in the absence of oxygen and in the presence of 25% v./v. oxygen based on the butene-1. The results obtained are given below.

of the support materials were then determined by the mercury penetration method.

The dehydrogenation activities of the impregnated supports for the dehydrogenation of butene-1 were determined in the manner generally described in Example 1 in the absence of oxygen at 600° C. A dehydrogenation activity determination was also made on the bismuth-free sintered alumina support. The pore size distribution results are given in Table 9 and the dehydrogenation activities are given in Table 10.

TABLE 8.—NON-OXIDATIVE DEHYDROGENATION OF BUTENE-1 WITH A MAGNESIUM PHOSPHATE/BISMUTH OXIDE CATALYST

| Test No. | Catalyst Composition | | | Dehydrogenation temperature | | | | | | | | |
|---|---|---|---|---|---|---|---|---|---|---|---|---|
| | | | | 580° C. | | | 600° C. | | | 620° C. | | |
| | Mg$_3$(PO$_4$)$_2$ | Bi$_2$O$_3$ | Cr$_2$O$_3$ | %C | %S | %Y | %C | %S | %Y | %C | %S | %Y |
| 22 | 50 | 50 | 2 | 24.8 | 72.4 | 18.0 | 31.1 | 81.9 | 25.5 | 38.1 | 78.7 | 30.0 |

TABLE 9.—PORE SIZE DISTRIBUTIONS OF VARIOUS CATALYST SUPPORTS

| Test No. | Support | Pore size distributions—percentage of total pore volume from pores of specified diameters | | | | | | | | | | |
|---|---|---|---|---|---|---|---|---|---|---|---|---|
| | | <1,000 A. | 1,000–2,000 A. | 2,000–3,000 A. | 3,000–4,000 A. | 4,000–5,000 A. | 5,000–6,000 A. | 6,000–7,000 A. | 7,000–8,000 A. | >8,000 A. | 1,000–8,000 A. | 1,000–6,000 A. |
| 24 | Sintered alumina | 3.0 | 66.8 | 66.8 | 66.8 | 16.1 | 16.1 | 10.6 | 10.6 | 3.5 | 93.5 | 82.9 |
| 25 | Extruded silicon carbide | 0 | 0 | 0 | 0 | 0 | 0 | 0 | 0 | >99 | 0 | 0 |
| 26 | Extruded silica | 0 | 0 | 0 | 0 | 0 | 0 | 0 | 0 | >99 | 0 | 0 |

TABLE 10.—NON-OXIDATIVE DEHYDROGENATION OF BUTENE-1 WITH BISMUTH-IMPREGNATED CATALYSTS

| Test No. | Catalyst description | | Pore size (diameter) distribution * (percent) | | Dehydrogenation activity at 600° C. | | |
|---|---|---|---|---|---|---|---|
| | Support | Bismuth content (Percent $Bi_2O_3$) | 1,000–8,000 A. | 1,000–6,000 A. | %C | %S | %Y |
| 24 | Sintered alumina | None | 93.5 | 82.9 | Negligible | | |
| 27 | do | 16.4 | 93.5 | 82.9 | 38.8 | 45.8 | 17.8 |
| 28 | Extruded silicon carbide | 17.3 | 0 | 0 | 4.3 | 53.1 | 2.3 |
| 29 | Extruded silica | 23.8 | 0 | 0 | 4.0 | 58.5 | 2.3 |

*The pore size distribution values are quoted from Table 9 and apply to the bisumth-free supports.

From these results, it is readily seen that the only support of those tested which conforms to the pore size distribution requirements set down for use in the catalysts of the present invention is the sintered alumina one (Tests Nos. 24 and 27). It is also readily seen that this material has, in itself, no significant dehydrogenation activity (Test No. 24) but, when impregnated so as to contain 16.4% bismuth oxide, the resultant catalyst has significant activity, Test No. 27). Neither of the other supports tested conformed to the pore size distribution requirements for supports for the catalysts of the present invention and, when impregnated with a bismuth compound, neither showed any significant dehydrogenation activity (Tests Nos. 28 and 29).

We claim:

1. A hydrocarbon dehydrogenation catalyst comprising from 1 to 80% by weight of at least one bismuth compound on a support of which at least 80% of the total pore volume is contributed by pores having diameters in the range of from 1,000 to 8,000 A., said support comprising calcium phosphate or magnesium phosphate.

2. A catalyst according to claim 1 comprising from 5 to 60% by weight of a bismuth compound selected from the group consisting of bismuth oxide, bismuth hydroxide, bismuth phosphate and bismuth phosphomolybdate.

3. A catalyst according to claim 2 in which at least 80% of the total pore volume of the support is contributed by pores having diameters in the range of from 1,000 to 8,000 A.

4. A catalyst according to claim 3 in which at least 90% of the total pore volume of the support is contributed by pores having diameters in the range of from 1000 to 6000 A.

5. A process for the dehydrogenation of a hydrocarbon feed comprising at least one hydrocarbon selected from aliphatic monoolefins having at least four carbon atoms in their unsaturated carbon chains, alkylated aromatic hydrocarbons having at least two carbon atoms in their alkyl groups, cycloaliphatic olefins having five to eight carbon atoms in their olefinically unsaturated rings, and cycloalkanes having five to seven carbon atoms, which process comprises effecting the dehydrogenation in the presence of a catalyst comprising from 1 to 80% by weight of at least one bismuth compound on a support of which at least 80% of the total pore volume is contributed by pores having diameters in the range of from 1,000 to 8,000 A., said support comprising calcium phosphate or magnesium phosphate.

6. A process according to claim 5 for the dehydrogenation of a hydrocarbon feed comprising at least one hydrocarbon selected from the group consisting of aliphatic monoolefins having four to six carbon atoms in their unsaturated carbon chains, alkylated aromatic hydrocarbons having two to four carbon atoms in their alkyl groups, cycloaliphatic olefins having five to eight carbon atoms in their olefinically unsaturated rings, and cycloalkanes having five to seven carbon atoms, which process comprises effecting the dehydrogenation in the presence of steam and at temperatures between 500 and 750° C.

7. A process according to claim 6 which comprises effecting the dehydrogenation in the presence of from 10 to 25 volumes of steam per volume of hydrocarbon and at temperatures between 500 and 650° C.

8. A process according to claim 7 in which the catalyst contains from 20 to 60% of a bismuth compound selected from bismuth oxide, bismuth hydroxide, bismuth phosphate and bismuth phosphomolybdate.

9. A process according to claim 8 for the dehydrogenation of a hydrocarbon feed comprising at least one n-butene.

10. A process according to claim 9 for the dehydrogenation of a hydrocarbon feed comprising at least one n-butene, and in which the catalyst additionally contains from 0.5 to 5% by weight of chromic oxide.

11. A process for the dehydrogenation of a hydrocarbon feed comprising at least one hydrocarbon selected from the group consisting of aliphatic monoolefins having four to six carbon atoms in their unsaturated carbon chains, alkylated aromatic hydrocarbons having two to four carbon atoms in their alkyl groups, cycloaliphatic olefins having five to eight carbon atoms in their olefinically unsaturated rings, and cycloalkanes having five to seven carbon atoms, which process comprises effecting the dehydrogenation in the presence of from 10 to 25 volumes of steam per volume of hydrocarbon and at a temperature between 500 and 650° C., and in the presence of a catalyst which contains 20 to 60% by weight of at least one bismuth compound selected from the group consisting of bismuth oxide, bismuth hydroxide, bismuth phosphate and bismuth phosphomolybdate, and a calcium phosphate support of which at least 90% of the total pore volume is contributed by pores having diameters in the range of from 1,000 to 6,000 A.

12. A process according to claim 11 in which the catalyst also contains from 0.5 to 5% by weight of chromic oxide.

References Cited

UNITED STATES PATENTS

| | | | |
|---|---|---|---|
| 2,684,951 | 7/1954 | Mottern | 252—464 X |
| 2,991,321 | 7/1961 | Voge et al. | 260—680 |
| 2,991,322 | 7/1961 | Armstrong et al. | 260—680 |
| 3,157,688 | 11/1964 | Arnold et al. | 252—464 X |
| 3,260,753 | 7/1966 | McDaniel et al. | 252—464 X |
| 3,320,330 | 5/1967 | Callahan et al. | 260—680 |

PAUL M. COUGHLAN, JR., Primary Examiner.